(12) United States Patent
Michaud et al.

(10) Patent No.: US 6,928,418 B2
(45) Date of Patent: *Aug. 9, 2005

(54) PORTFOLIO REBALANCING BY MEANS OF RESAMPLED EFFICIENT FRONTIERS

(75) Inventors: Robert Michaud, Boston, MA (US); Richard O. Michaud, Boston, MA (US)

(73) Assignee: Michaud Partners, LLP, Boston, MA (US)

( * ) Notice: Subject to any disclaimer, the term of this patent is extended or adjusted under 35 U.S.C. 154(b) by 29 days.

This patent is subject to a terminal disclaimer.

(21) Appl. No.: 10/280,384

(22) Filed: Oct. 25, 2002

(65) Prior Publication Data

US 2004/0083150 A1 Apr. 29, 2004

(51) Int. Cl.$^7$ ............................................. G06F 17/60
(52) U.S. Cl. ............................. 705/36; 705/35; 705/7
(58) Field of Search .............................. 705/35–40, 7

(56) References Cited

U.S. PATENT DOCUMENTS

| | | | |
|---|---|---|---|
| 5,126,936 A | 6/1992 | Champion et al. | 364/408 |
| 5,148,365 A | 9/1992 | Dembo | 364/402 |
| 5,729,700 A | 3/1998 | Melnikoff | 395/236 |
| 5,761,442 A | 6/1998 | Barr et al. | 395/235 |
| 5,819,238 A | 10/1998 | Fernholz | 705/36 |
| 6,003,018 A | 12/1999 | Michaud et al. | 705/36 |
| 6,275,814 B1 | 8/2001 | Giansante et al. | 705/36 |
| 6,292,787 B1 | 9/2001 | Scott et al. | 705/36 |
| 6,349,291 B1 * | 2/2002 | Varma | 705/35 |
| 2002/0123951 A1 * | 9/2002 | Olsen et al. | 705/36 |
| 2002/0123953 A1 * | 9/2002 | Goldfarb et al. | 705/36 |
| 2002/0138383 A1 | 9/2002 | Rhee | |
| 2002/0143682 A1 * | 10/2002 | Bergmann et al. | 705/36 |
| 2003/0088492 A1 * | 5/2003 | Damschroder | 705/36 |
| 2003/0195831 A1 * | 10/2003 | Feldman | 705/36 |

OTHER PUBLICATIONS

Bey et al., "Measurement of Estimation Risk in Markowitz Portfolios," Draft Working Paper, University of Tulsa, Oct., 1990.

DiBartolomeo, "Estimation Error in Asset Allocation", May, 1991.

(Continued)

*Primary Examiner*—Hani Kazimi
*Assistant Examiner*—Narayanswamy Subramanian
(74) *Attorney, Agent, or Firm*—Bromberg & Sunstein LLP

(57) ABSTRACT

A method for evaluating statistical congruence of an existing or putative portfolio with a target portfolio, both the current portfolio and the target portfolio having a plurality of assets. A mean-variance efficient portfolio is computed for a plurality of simulations of input data statistically consistent with an expected return and expected standard deviation of return, and each such portfolio is associated, by means of an index, with a specified portfolio on the mean variance efficient frontier. The number of simulations and the number of simulations periods is specified on the basis of a specified information correlation value. A statistical mean of the index-associated mean-variance efficient portfolios is used for evaluating a portfolio, in accordance with a specified balancing test, for statistical consistency with a specified risk objective and, additionally, for defining investment-relevant allocation ranges of portfolio weights.

10 Claims, 15 Drawing Sheets

OTHER PUBLICATIONS

Broadie, "Computing Efficient Frontiers Using Estimated Parameters", Annals of Operations Research 45, 21–58, 1993.

Gold, "Why the Efficient Frontier for Real Estate is "Fuzzy"", *The Journal of Read Estate Portfolio Management*, vol. 1, No. 1, 1995.

DiBartolomeo, "Risk of Equity Securities and Portfolios", *Equity Specialization Program*, Readings Pilot Program 1997, vol. 2, III, Risk, Northfield Information Services, Inc., Feb. 22, 1997.

Michaud, *Efficient Asset Management, A Practical Guide to Stock Portfolio Optimization and Asset Allocation*, Chap 7, pp. 71–81, 1998.

Fletcher and Hiller, "An Examination of Resampled Portfolio Efficiency", Sep./Oct., 2001.

Michaud, "New Methods for Estimating Portfolio Risk and Improving Investment Value", The Hyatt University Village, Sep., 2001.

Simons, "Should Investors Invest Overseas", *New England Economic Review*, Nov./Dec., 1999.

Fernando, "Practical Portfolio Optimization", NAG Ltd., date unknown.

Wang, Zhao, Xing, "Financial data analysis with visualization and model simulation", 2002 (?).

Herald and Maurer, "How much foreign stocks?", *Classical versus Bayseian approaches*, No. 92, Jun., 2002.

Buetow et al., "The Benefits of Rebalancing", *The Journal of Portfolio Management*, Winter, 2002.

\* cited by examiner

PORTFOLIO REBALANCING BY MEANS OF RESAMPLED EFFICIENT FRONTIERS

TECHNICAL FIELD

The present invention relates to methods for controlling the discriminatory power of statistical tests of congruence between a current portfolio of tangible or intangible assets and a target portfolio and of defining normal ranges of allocation to asset classes within a portfolio.

BACKGROUND ART

Managers of assets, such as portfolios of stocks, projects in a firm, or other assets, typically seek to maximize the expected or average return on an overall investment of funds for a given level of risk as defined in terms of variance of return, either historically or as adjusted using techniques known to persons skilled in portfolio management. Alternatively, investment goals may be directed toward residual return with respect to a benchmark as a function of residual return variance. Consequently, the terms "return" and "variance," as used in this description and in any appended claims, may encompass, equally, the residual components as understood in the art. The capital asset pricing model of Sharpe and Lintner and the arbitrage pricing theory of Ross are examples of asset evaluation theories used in computing residual returns in the field of equity pricing. Alternatively, the goal of a portfolio management strategy may be cast as the minimization of risk for a given level of expected return.

The risk assigned to a portfolio is typically expressed in terms of its variance $\sigma_p^2$ stated in terms of the weighted variances of the individual assets, as:

$$\sigma_p^2 = \sum_i \sum_j w_i w_j \sigma_{ij},$$

where $w_i$ is the relative weight of the i-th asset within the portfolio, $\sigma_{ij} = \sigma_i \sigma_j \rho_{ij}$ is th covariance of the i-th and j-th assets, $\rho_{ij}$ is their correlation, and $\sigma_i$ is the standard deviation of the i-th asset. The portfolio standard deviation is the square root of the variance of the portfolio.

Following the classical paradigm due to Markowitz, a portfolio may be optimized, with the goal of deriving the peak average return for a given level of risk and any specified set of constraints, in order to derive a so-called "mean-variance (MV) efficient" portfolio using known techniques of linear or quadratic programming as appropriate. Techniques for incorporating multiperiod investment horizons are also known in the art. As shown in FIG. 1A, the expected return $\mu$ for a portfolio may be plotted versus the portfolio standard deviation $\sigma$, with the locus of MV efficient portfolios as a function of portfolio standard deviation referred to as the "MV efficient frontier," and designated by the numeral 10. Mathematical algorithms for deriving the MV efficient frontier are known in the art.

Referring to FIG. 1B, a variation of classical Markowitz MV efficiency often used is benchmark optimization. In this case, the expected residual return $\alpha$ relative to a specified benchmark is considered as a function of residual return variance $\omega$, defined as was the portfolio standard deviation $\sigma$ but with respect to a residual risk. An investor with portfolio A desires to optimize expected residual return at the same level $\omega_A$ of residual risk. As before, an efficient frontier 10 is defined as the locus of all portfolios having a maximum expected residual return $\alpha$ of each of all possible levels of portfolio residual risk.

Known deficiencies of MV optimization as a practical tool for investment management include the instability and ambiguity of solutions. It is known that MV optimization may give rise to solutions which are both unstable with respect to small changes (within the uncertainties of the input parameters) and often non-intuitive and thus of little investment sense or value for investment purposes and with poor out-of-sample average performance. These deficiencies are known to arise due to the propensity of MV optimization as "estimation-error maximizers," as discussed in R. Michaud, "The Markowitz Optimization Enigma: Is Optimized Optimal?" *Financial Analysts Journal* (1989), which is herein incorporated by reference. In particular, MV optimization tends to overweight those assets having large statistical estimation errors associated with large estimated returns, small variances, and negative correlations, often resulting in poor ex-post performance.

Resampling of a plurality of simulations of input data statistically consistent with an expected return and expected standard deviation of return has been applied (see, for example, Broadie, "Computing efficient frontiers using estimated parameters", 45 *Annals of Operations Research* 21–58 (1993)) in efforts to overcome some of the statistical deficiencies inherent in use of sample moments alone. Comprehensive techniques based on a resample efficient frontier are described in U.S. Pat. No. 6,003,018 (Michaud et al. '018), issued Dec. 14, 1999, and in the book, R. Michaud, *Efficient Asset Management,* (Harvard Business School Press, 1998), that MV optimization is a statistical procedure, based on estimated returns subject to a statistical variance, and that, consequently, the MV efficient frontier, as defined above, is itself characterized by a variance. The Michaud patent and book are incorporated herein by reference, as are all references cited in the text of the book.

As taught in the Michaud '018 patent, an MV efficient frontier is first calculated by using standard techniques as discussed above. Since the input data are of a statistical nature (i.e., characterized by means with associated variances and other statistical measures), the input data may be resampled, by simulation of optimization input parameters in a manner statistically consistent with the first set of data, as described, for example, by J. Jobson and B. Korkie, "Estimation for Markowitz Efficient Portfolios," *Journal of Portfolio Management,* (1981), which is herein incorporated by reference. Embodiments of the present invention are related to improvements and extensions of the teaching of the Michaud '018 patent.

When portfolios are rebalanced in accordance with current practice, criteria are applied that are typically not portfolio-based or consistent with principles of modern statistics but are generally associated with various ad hoc rules. U.S. Pat. No. 6,003,018 teaches a portfolio-based rebalancing criterion that can be used for all portfolios on the resampled efficient frontier and that is consistent with principles of modern statistics and considers the uncertainty in investment information. However, this rule has some important limitations. Its discriminatory power is not customizable and has too high power at low levels of risk and too little power at high levels of risk. Methods are clearly necessary for providing relatively uniform discriminatory power across portfolio risk levels as well as being able to customize discriminatory power according to the investment needs of organizations which differ in terms of user sophistication, asset class characteristics, or investment strategy requirements. Methods are also clearly desirable that help identify anomalously weighted assets (overly large or small weights) relative to a normal range that is associated with the uncertainty of investment information.

SUMMARY OF THE INVENTION

In accordance with preferred embodiments of the present invention, a method is provided for selecting a value of a portfolio weight for each of a plurality of assets of an optimal portfolio, wherein the selected value of portfolio weight is chosen from specified values associated with each asset, between real numbers $c_1$ and $c_2$ that may vary by asset, for the plurality of assets. Each asset has a defined expected return and a defined standard deviation of return, and a covariance with respect to each of every other asset of the plurality of assets. The method has the steps of:

- a. computing a mean-variance efficient frontier portfolio based at least on input data characterizing the defined expected return and the defined standard deviation of return of each of the plurality of assets;
- b. generating a plurality of optimization inputs consistent with the defined expected return, the defined standard deviation of return of each of the plurality of assets, and forecast certainty of the input data;
- c. computing a simulated mean-variance efficient portfolio for each of the plurality of optimization inputs;
- d. associating each mean-variance efficient portfolio with a specified and indexed set of portfolios for creating a set of identical-index-associated mean-variance efficient portfolios;
- e. establishing a statistical mean for each set of identical-index-associated mean-variance efficient portfolios, thereby generating a plurality of statistical means, the plurality of statistical means defining a resampled efficient frontier;
- f. selecting a portfolio weight for each asset from the resampled efficient frontier associated with a forecast certainty level according to a specified risk objective; and
- g. investing funds in accordance with the specified portfolio weights.

In accordance with further embodiments of the invention, the step of generating a plurality of optimization inputs may include resampling a plurality of simulations of input data or may include drawing optimization input parameters from a distribution of simulated optimization inputs.

In any of the foregoing cases, in accordance with further embodiments of the invention, a forecast certainty level may be chosen from a collection of forecast certainty levels for defining a resampling process of the input data consistent with the assumed forecast certainty of the input data, and the forecast certainty level may be chosen from a set of indices from 1 to N, where each index is calibrated to provide a different level of forecast certainty. The number of samples drawn from a distribution may be increased, based on a higher level of forecast certainty, and, more particularly, each level may represent a geometric increase (or decrease) in the number of observations drawn from the distribution.

In accordance with further embodiments of the invention, the step of associating each mean-variance efficient portfolio with a specified and indexed set of portfolios may include indexing a set of portfolios located on the mean-variance efficient frontier in terms of proximity to a maximized expected utility.

In accordance with yet further embodiments of the invention, a method is provided for determining whether to rebalance the distribution of assets in a current portfolio. The method has the steps of:

- a. computing a set of resampled efficient portfolios;
- b. identifying a target portfolio from among the set of resampled efficient portfolios based on a specified criterion;
- c. defining a statistical metric of the target portfolio based on norm values of a set of index-set associated simulated efficient portfolios;
- d. performing a statistical test of the current portfolio with respect to the target portfolio as to whether the current portfolio is statistically distinct from the target portfolio to a specified confidence level; and
- e. rebalancing the current portfolio in case the current test is statistically distinct from the target portfolio.

The method may include calibrating the statistical test with respect to the identified target portfolio and executing a rebalancing decision without further user input.

In the foregoing, the step of identifying a target portfolio from among the set of resampled efficient portfolios may include identifying the target portfolio on the basis of maximum expected utility of the target portfolio, and the step of performing a statistical test of the current portfolio may include weighting each portfolio of the set of resampled efficient portfolios in accordance with a proximity of the portfolio to the current portfolio. There may be included additional steps of deriving the resampled efficient portfolios from a selected set of relevant simulations of asset performance, and rebalancing the current portfolio in case an asset of the current portfolio is outside a range of statistical congruence with that of the target portfolio. Finally, the step of performing a statistical test of the current portfolio may include specifying a number of portfolios per simulation to be considered in the statistical test.

A computer program product may be provided, in accordance with other embodiments of the invention, for use on a computer system for selecting a value of portfolio weight for each of a specified plurality of assets of an optimal portfolio. The computer program product has:

- a. program code for computing a mean-variance efficient frontier based at least on input data characterizing the defined expected return and the defined standard deviation of return of each of the plurality of assets;
- b. program code for aggregating a set of portfolios located on the mean variance efficient frontier;
- c. a routine for resampling a plurality of simulations of input data statistically consistent with the defined expected return and the defined standard deviation of return of each of the plurality of assets;
- d. program code for computing a mean-variance efficient portfolio for each of the plurality of simulations of input data;
- e. program code for associating each simulated mean-variance efficient portfolio with a specified portfolio of the set of aggregated portfolios for creating a set of associated mean-variance efficient portfolios;
- f. a module for establishing a statistical mean for each set of associated mean-variance efficient portfolios, the plurality of statistical means defining the resampled efficient frontier; and
- g. program code for selecting a portfolio weight for each asset from the resampled efficient frontier according to a specified risk objective.

BRIEF DESCRIPTION OF THE DRAWINGS

The invention will be more readily understood by reference to the following description, taken with the accompanying drawings, in which.

DETAILED DESCRIPTION OF SPECIFIC EMBODIMENTS

MV-efficient portfolios may be recalculated, based on distinct resamplings of data, subject to the same constraints as applied in the initial solution. Inputs to each solution include the forecast returns and standard deviations and distributional assumptions of returns drawn, typically, for a plurality of asset classes (stocks, mutual funds, currencies, etc.) from a multivariate distribution. Correlations across asset classes are also input.

In accordance with preferred methods for resampling when no additional distributional information is known, simulated returns are drawn for a plurality of asset classes from a multivariate normal distribution. Other resampling methodologies may entail bootstrapping of historical data or resampling under distributional assumptions (for instance, if skew or kurtosis of returns is known). This Monte Carlo simulation generates different forecasts of risk and return, including, but not limited to, mean, standard deviation, and correlation, to be used in each computation of MV-efficient portfolios.

As an alternative procedure when the distribution of simulated optimization inputs is known, resampled optimization input parameters (mean return, standard deviation, correlations, etc.) may be drawn from their distribution. For example, if multivariate normality of returns is assumed and the vector of returns r for all assets is modeled by $r \sim N(\mu, \Sigma)$, and a forecast certainty corresponding to N observations of return is given, in each simulation i, a forecast mean return $\mu_i$ and covariance of returns $\Sigma_i$ can be modeled by:

$$\mu_i \sim N(\mu, \Sigma/N)$$

$$\Sigma_i \sim \text{Inv-Wishart}_{N-1}(\Sigma),$$

where Wishart distributions, their notation, and their application to unknown covariance matrices is discussed in detail in Gelman et al., *Bayesian Data Analysis,* Chapman & Hall (1995), which is incorporated herein by reference.

Figure 1A:
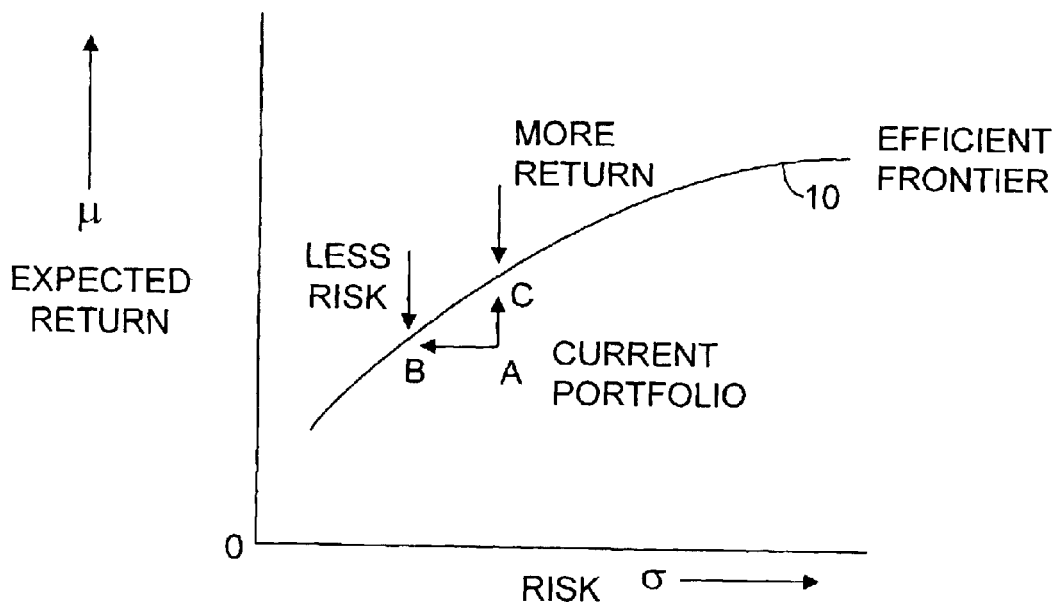
FIG. 1A depicts the prior art principle of calculating an efficient frontier of maximum expected return for each given level of portfolio risk.
Figure 1B:
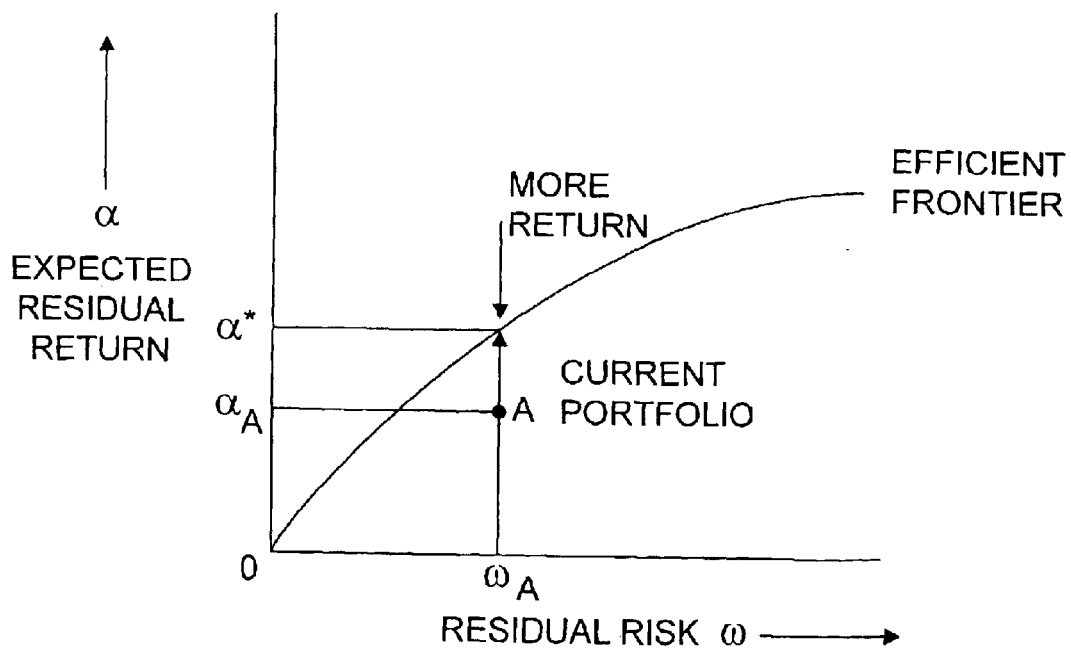
FIG. 1B depicts the prior art principle of calculating an efficient frontier of maximum expected residual return for each given level of portfolio residual risk.

The constraints applied to each of the solutions, given the aforesaid optimization inputs, include constraints placed on the set of weights accorded to the various components of the portfolio. An efficient solution may be sought in which the solution is a set of weights $\{w_i\}$ of assets comprising a portfolio or, else, a set of active weights $\{x_i\}$ of assets defined differentially with respect to a benchmark portfolio. In the latter case, the benchmark portfolio is designated, in FIG. 1B, as point 'A' with respect to which residual risk and expected residual return are plotted in the figure. In either case (i.e., whether the weights are to be solved for absolutely or with respect to a benchmark portfolio), the weights are subject to constraints specified by the user. These constraints may include, for example, a constraint that one or more specified weights, or the sum of specific weights, must lie between two specified real numbers, $c_1$ and $c_2$. For example, $c_1$ and $c_2$ may correspond, respectively, to 0 and 1. The inclusion of negative weights allows the resampled frontier, discussed below, to include portfolios of both long and short asset weights. Similarly, the sum of portfolio weights may be constrained, for example, by requiring the sum to equal an amount to be invested, or, conventionally, 1.

Figure 2:
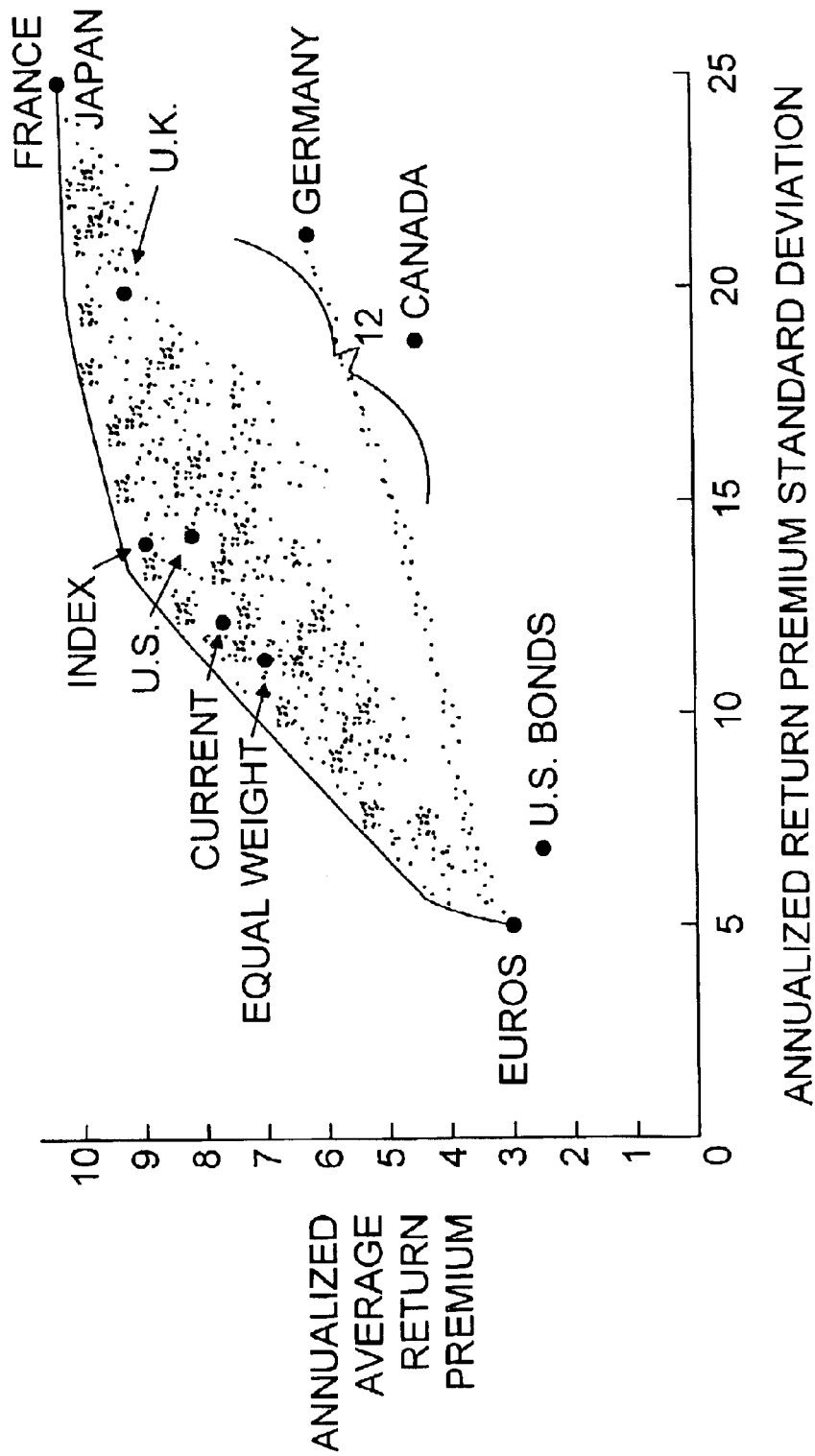
FIG. 2 displays a set of statistically equivalent portfolios within the risk/return plane.

Based on multiple resamplings, as shown in FIG. 2, a set 12 of statistically equivalent MV efficient portfolios may be calculated. By iterating this procedure, a large MV efficient "statistical equivalence" set of portfolios, in the expected return—portfolio variance space, may be generated. Multiple resamplings may be based upon returns drawn a specified number of times from an assumed distribution for a particular asset class. All α priori sets of assumptions with respect to the distribution are within the scope of the present invention; for example, the distributions may be defined by bootstrapping, normal, log-normal, mixed, etc. As an alternative algorithm, statistical input parameters (mean return, standard deviation, correlations) may be derived from a set of returns drawn from a particular simulation, and those parameters, in turn, used, in a bootstrapping manner, for subsequent resamplings, thus resampled distributions may serve the same function as resampled returns with respect to derivation of a resampled efficient frontier that may be referred to as a 'meta-resampled efficient frontier.'

Referring now to FIGS. 3A–3F, a process is described for deriving a Portfolio Rebalancing Index, which describes the percentile level of a portfolio norm relative to a distribution of portfolio norms, as will be described below.

Figure 3A:
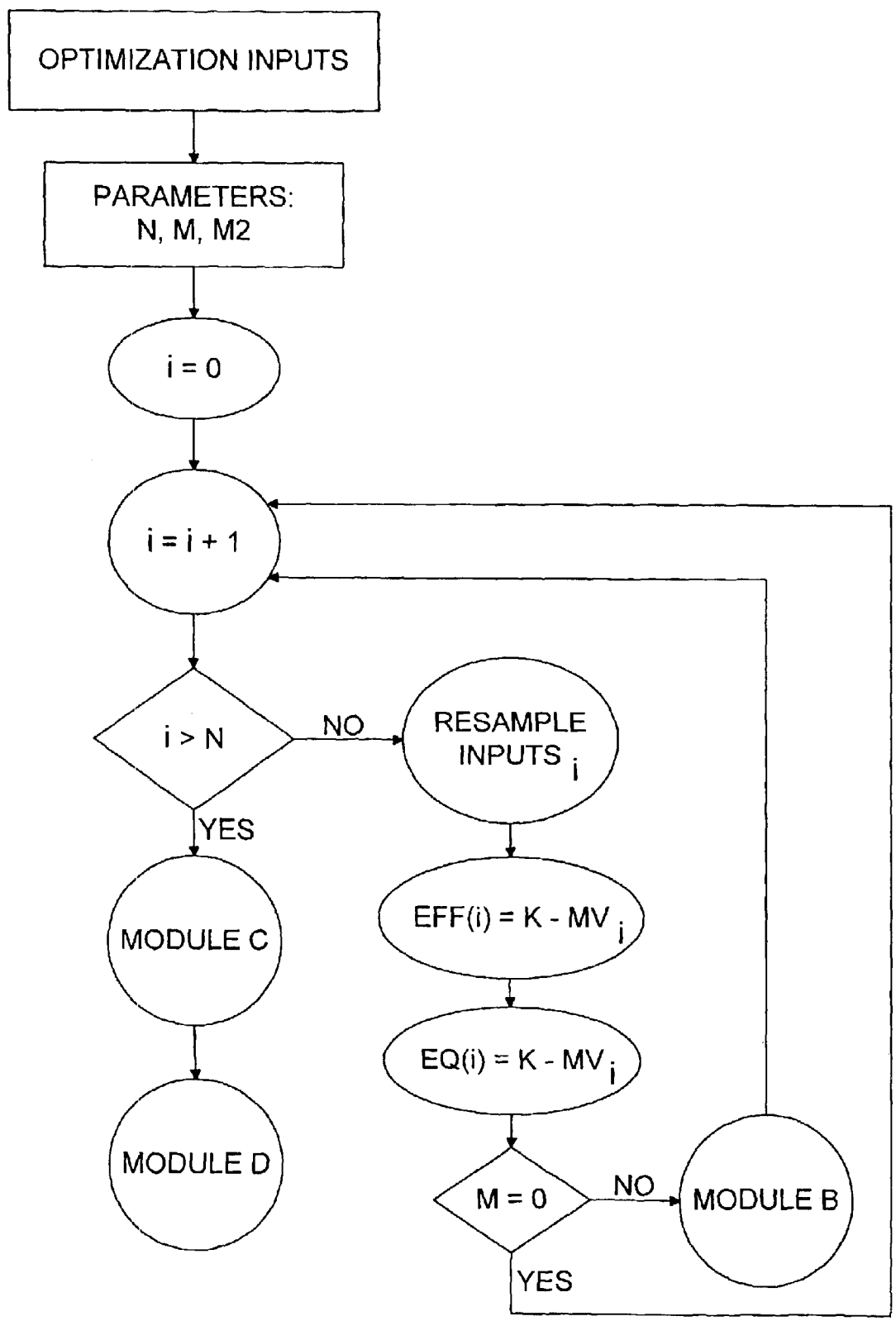
FIGS. 3A–3F represent constituent modules of a flowchart depicting a process for computing a portfolio rebalancing index, in accordance with embodiments of the present invention.
Figure 3B:
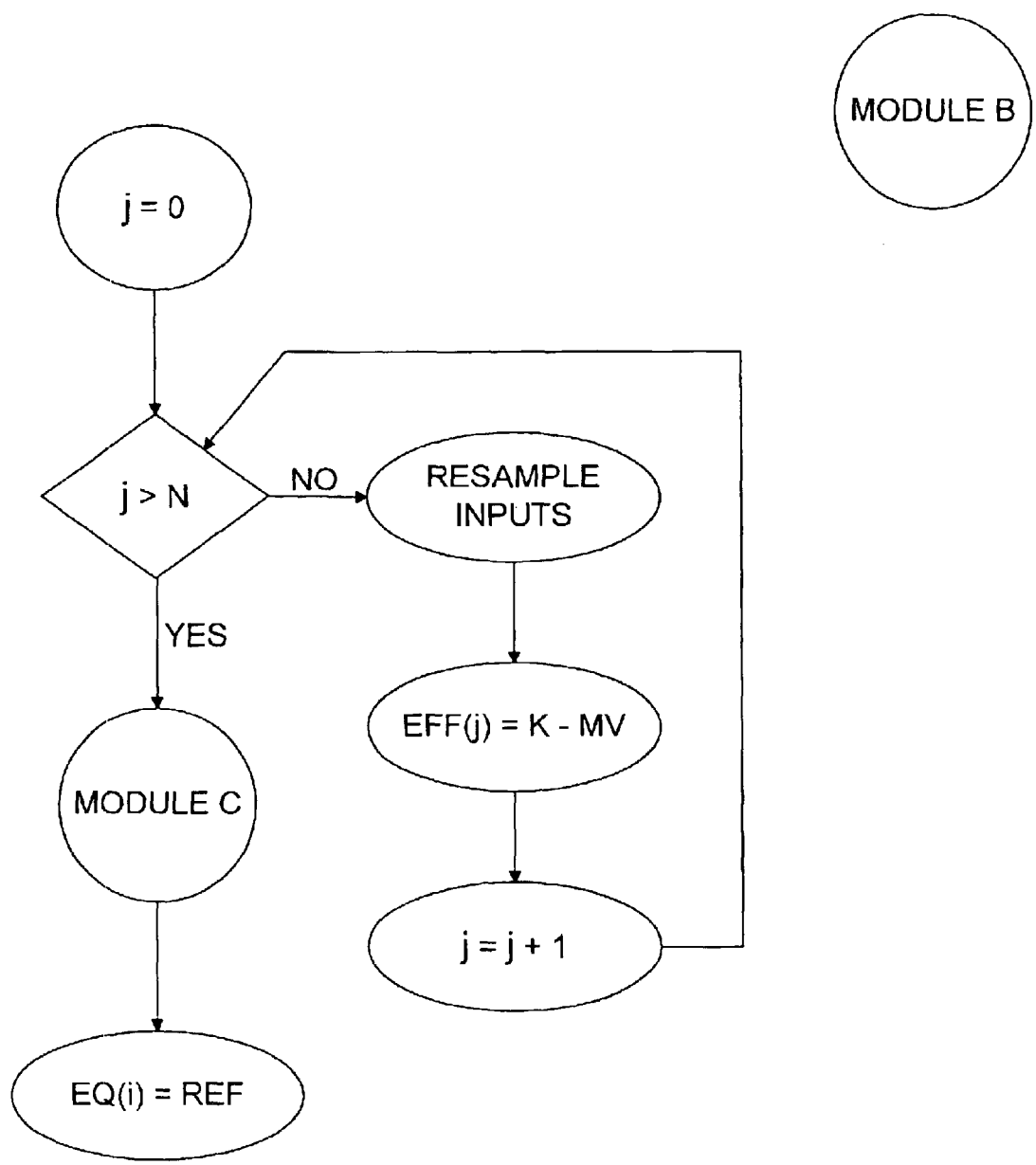
Figure 3C:
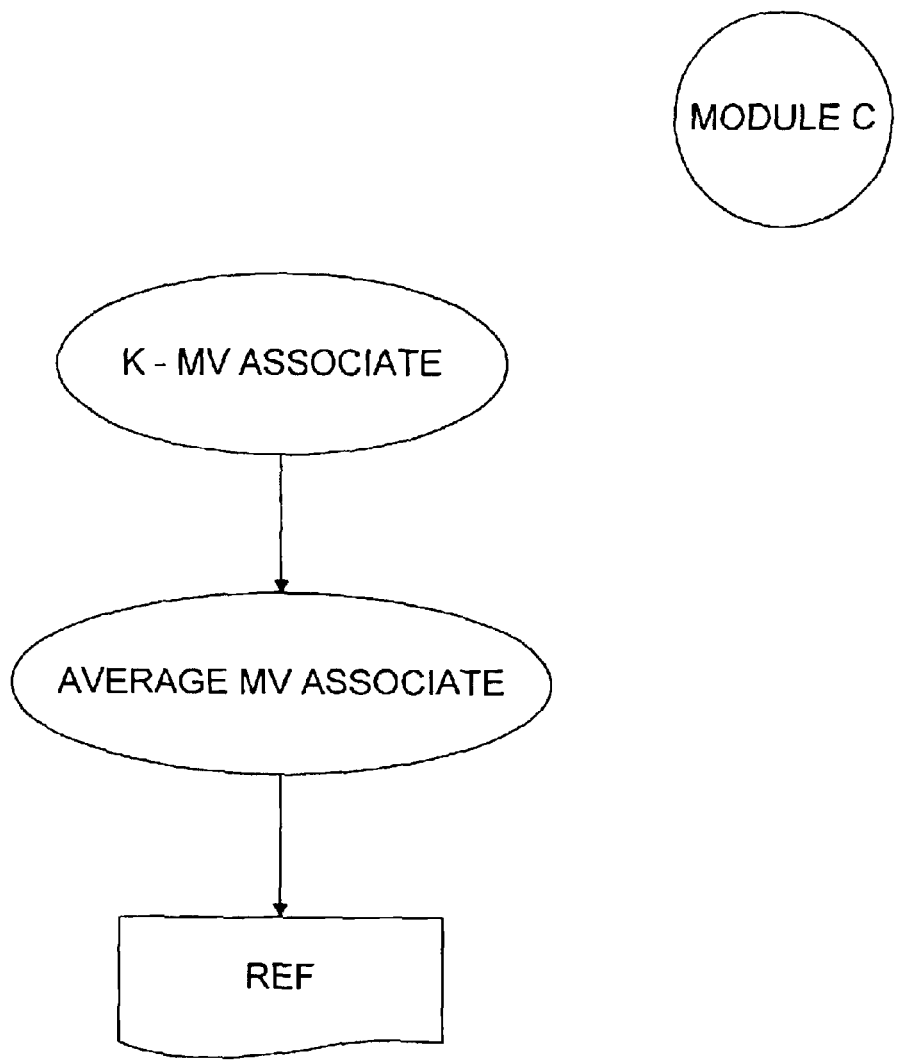

As shown in FIG. 3A, a set of initial Optimization Inputs, based on historical performance data relative to a set of assets, or otherwise, is provided by a user. Based on any such Optimization Inputs, a set of K mean-variance (MV) optimized portfolios may be calculated using classical Markowitz optimization. These K mean-variance optimized portfolios span the mean-variance efficient frontier for a given set of optimization inputs, in that they encompass the range either from minimum low to maximum high risk or minimum low to maximum high expected return. The set of K portfolios spanning the mean-variance efficient frontier for a given set of optimization inputs will be referred to as 'K-MV'.

At this stage, three parameters may be defined, which will have the respective significance as now indicated:

N designates the total number of resampled sets of optimization inputs of the initial optimization inputs;

M designates the number of resampled sets of optimization inputs of a given set of resampled optimization inputs; and M2 designates the number of randomly chosen K-MV portfolios from the N simulated K-MV portfolios.

The running index i is the index over which successive variables are stepped for successive sets of resampled optimization inputs in deriving a distribution of portfolio norms.

Until the process is complete, i.e., as long as i is less than N, as i is incremented, a set of resampled inputs is created in the step labeled Resample Inputs. In this step, a new set of risk and return inputs is created for a given level of confidence in the inputs. The distribution for the resampled inputs is based on the original inputs (or the previous resampled inputs when resampling inputs in module B, as described below). An efficient frontier (designated EFF(i)) is derived for each new set of resampled inputs, namely the set K-MV described above, and the same set is also stored as a set of Equivalent Portfolios EQ(i).

Module B (FIG. 3B) performs N successive resamplings and stores the K-MV efficient frontier portfolios in the array EFF. Once this has been completed, Module C (FIG. 3C) first associates the portfolios of the simulated K-MV with portfolios from other K-MV efficient portfolios. Various procedures for associating portfolios of K-MV sets are discussed below, whether by rank order value from each K-MV, or otherwise. Once portfolios from the various K-MVs have been associated, they are averaged (again, in a generalized sense, as described below) in order to derive the resampled efficient frontier (designated REF).

Figure 3D:
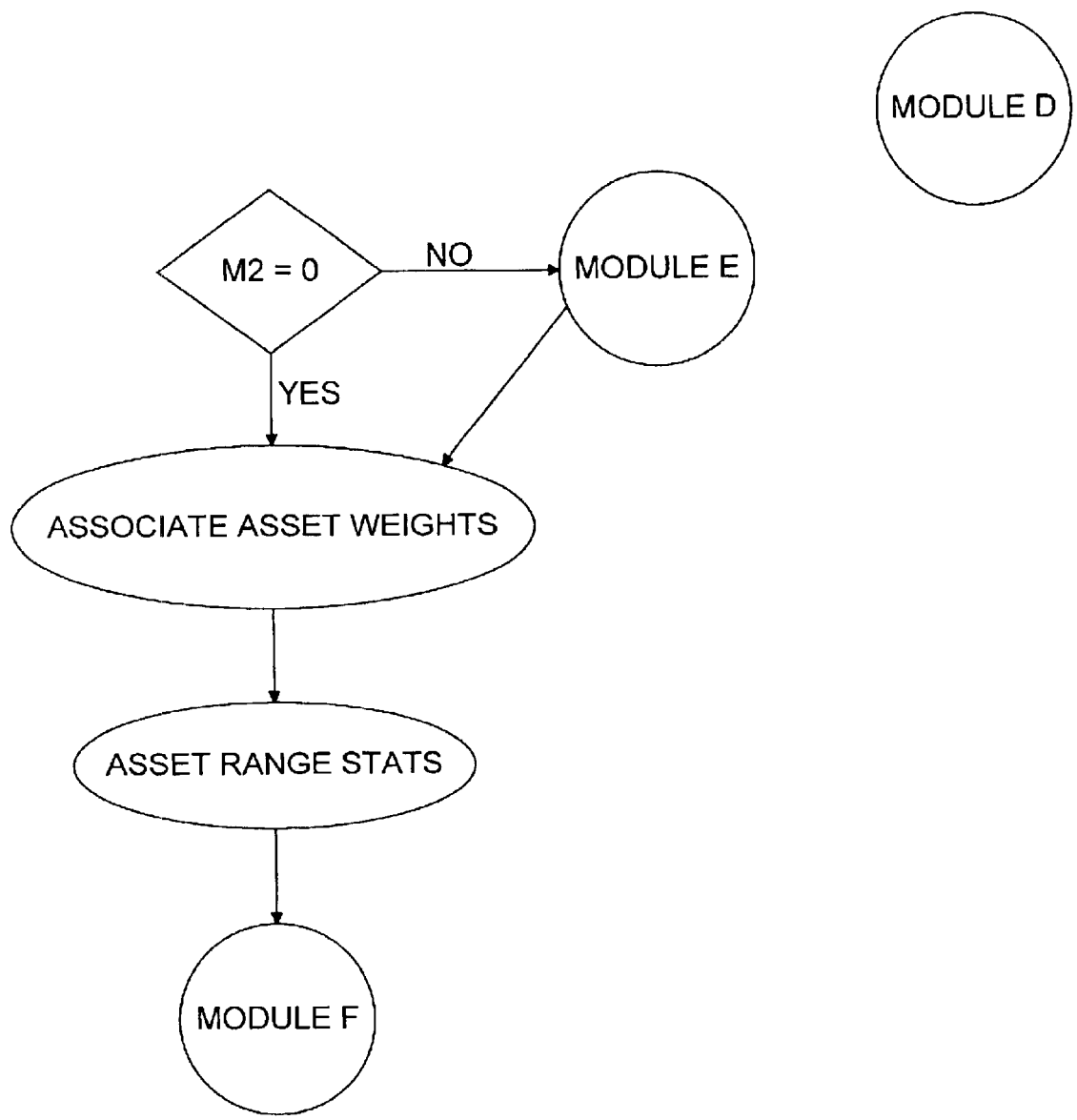
Figure 3E:
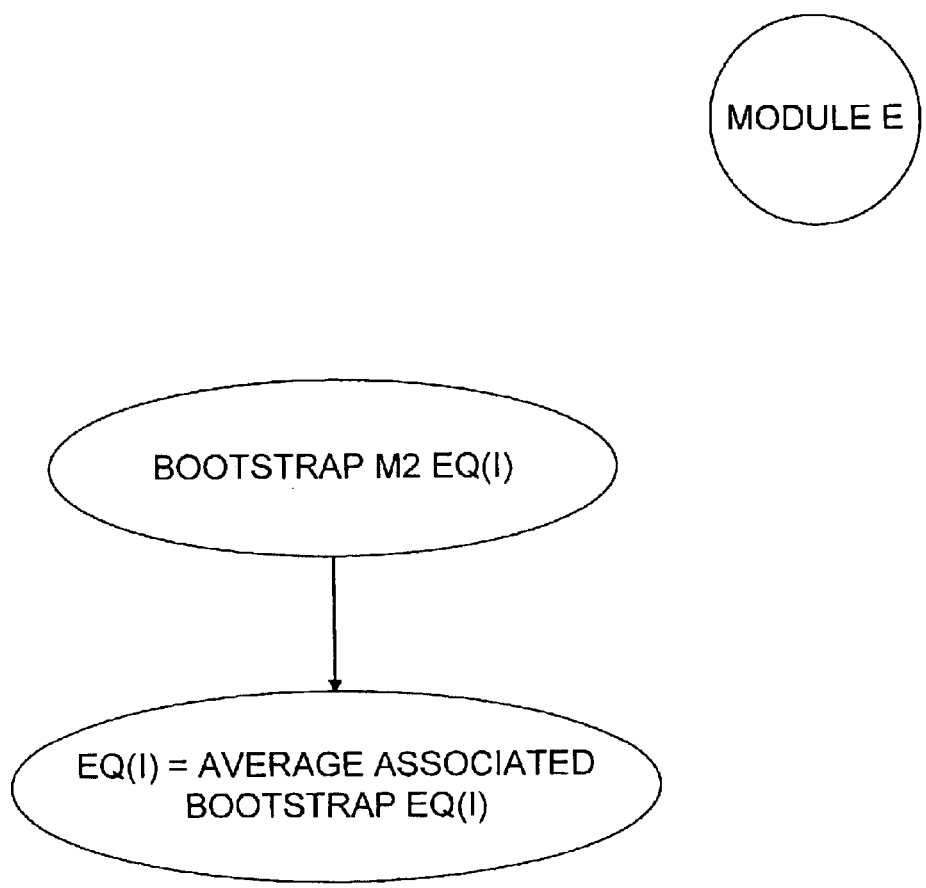

As shown in FIG. 3D, if M2 is non-zero, associated portfolios are bootstrapped, that is to say, M2 associated portfolios are randomly selected from the set of simulated equivalent portfolios and averaged to form a new set of equivalent portfolios EQ(i).

Once the new set of equivalent portfolios is set up, statistics may be performed on the asset weights of the K portfolios of the Resampled Equivalent Frontier with respect to the distribution of the associated asset weights, including their respective confidence percentiles, and other statistical measures, as shown in FIG. 3D.

Figure 3F:
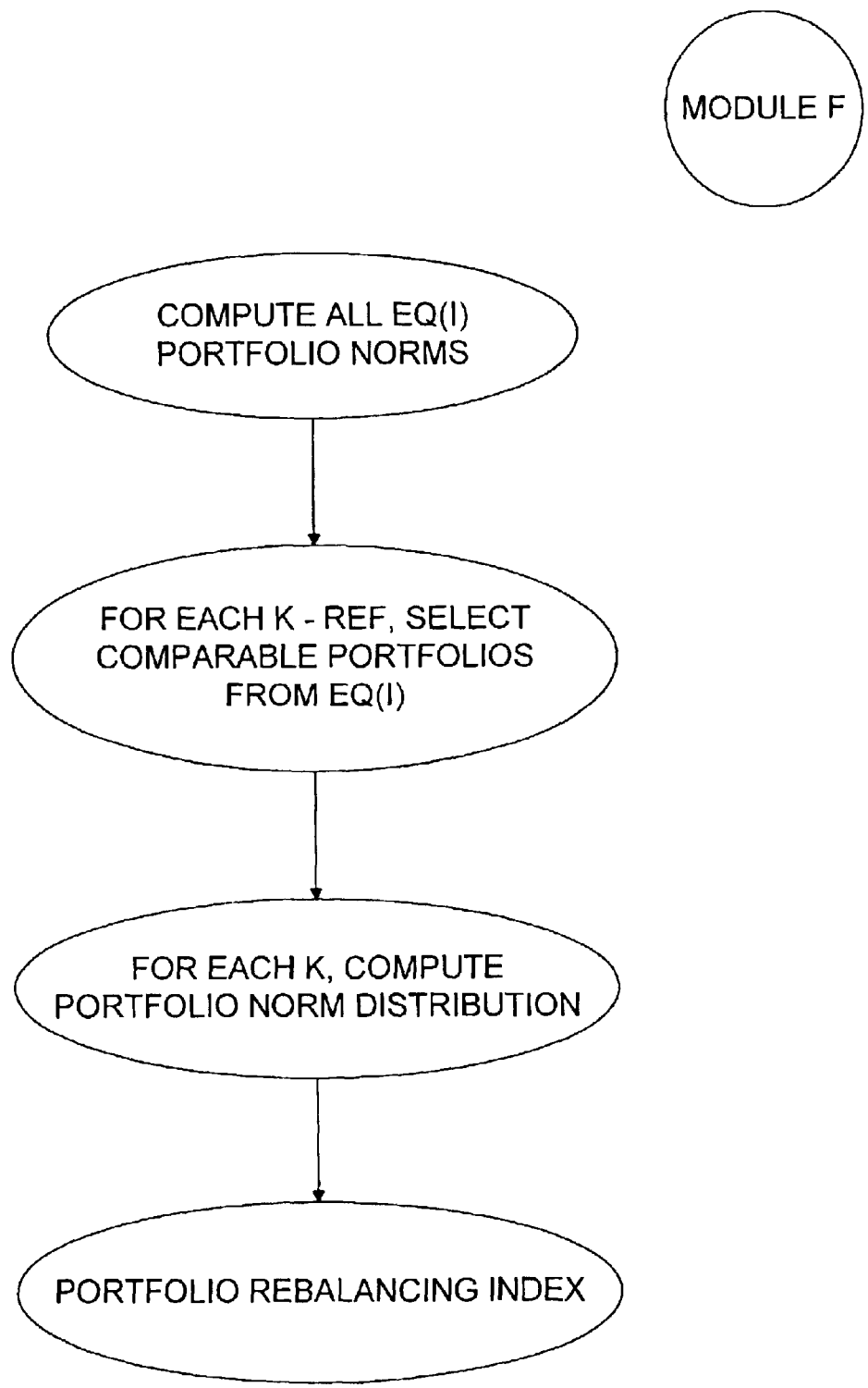

Referring, finally, to FIG. 3F, portfolio norms are computed, as discussed further below, for each simulated portfolio with respect to every portfolio (or a relevant subset) of the resampled efficient frontier. The various norms that may be employed are discussed below, but one norm entails the tracking error between two specified portfolios. In order to gauge the advisability of a portfolio rebalancing, for all K portfolios of the resampled efficient frontier, a set of simulated portfolios is chosen from EQ(i) that represents those deemed to be the most reasonable alternative investments. In a preferred embodiment of the invention, some fraction, typically about 5%, of the portfolios are selected, where this fraction encompasses those simulations with the smallest portfolio norm with respect to each corresponding portfolio of the resampled efficient frontier. The portfolio rebalancing index may then be determined as the percentile level of portfolio norm for a specified portfolio with respect to the portfolio norm distribution.

Rather than resampling based on historical returns, a further alternative procedure entails factor model resampling, wherein the set of returns is modeled according to a linear (in this example) model, such as:

$$r_i = \alpha_i + \beta'_i F + \text{(any other modeled terms)} + \epsilon_i,$$

where, for each asset 'i', $\alpha$ signifies asset-specific excess return, F signifies the vector of factor returns for all assets (be they returns associated with a representative portfolio, stylized factor, etc.), $\beta'_i$ signifies a (transposed) vector of coefficients to any factor return for asset 'i' (be they estimated historical, or, alternatively, current characteristic values of the asset, e.g., dividend-to-price ratio), and $\epsilon$ is a residual stochastic component of the return specific to asset 'i'. Factor returns may be modeled in a variety of ways, but typically each represents pervasive market factors, and, in this model, represents any variable influencing return of two or more assets. Statistical inputs may be specified for distributions of each of the constituent terms, whether based on systematic or idiosyncratic variance, which constituent terms may accordingly then be resampled.

Figure 4:
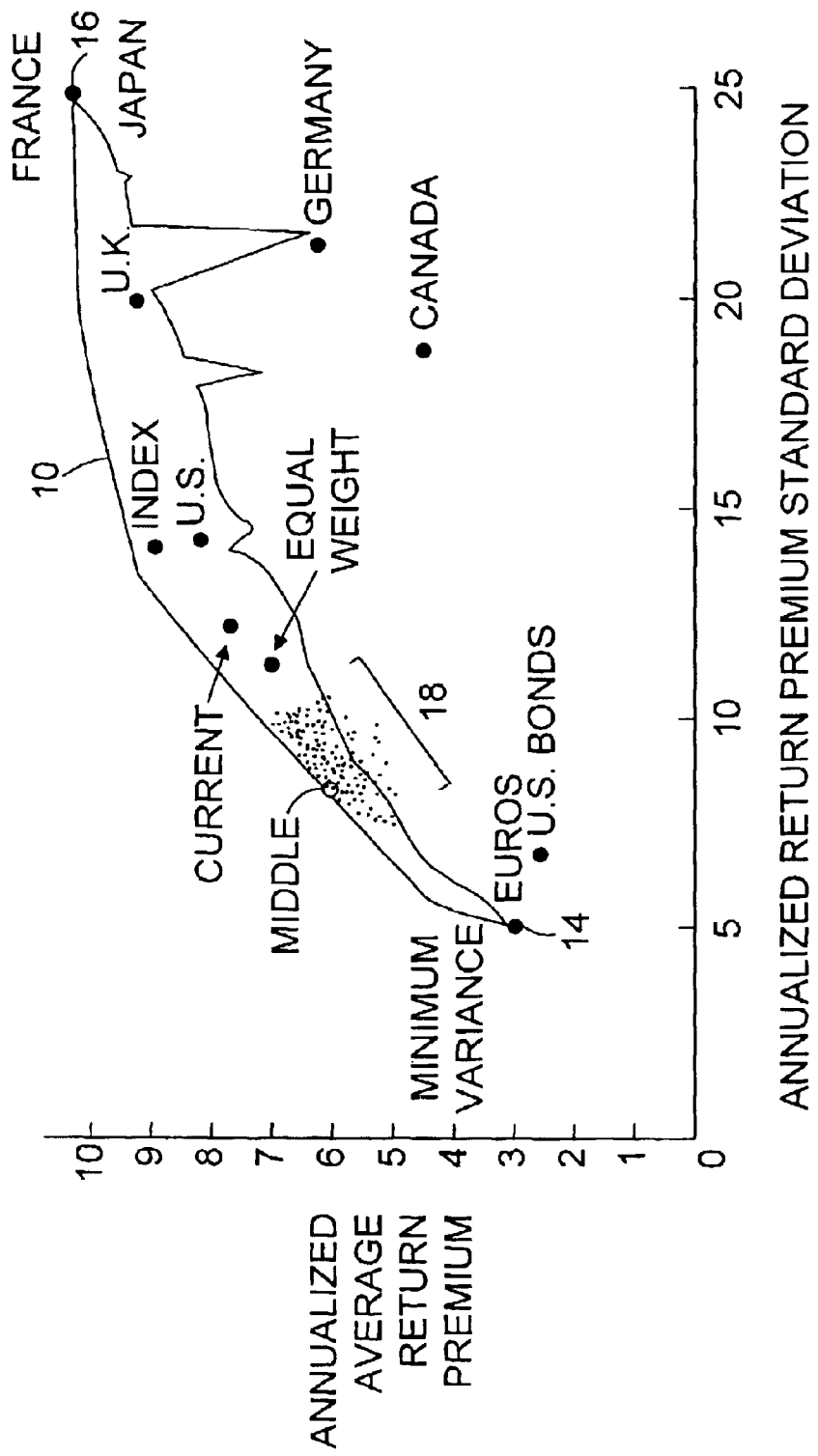
FIG. 4 displays statistically equivalent portfolios within the risk/return plane corresponding to three particular risk rankings on the efficient frontier: minimum variance, maximum return, and a middle return portfolio.

Based on application of a specified statistical procedure, an existing portfolio (or, the "CURRENT portfolio") may be found to be consistent, in a statistical sense, with efficiency and thus not require optimization, thereby potentially and advantageously saving transaction costs associated with revision of a portfolio. Alternatively, based on the same statistical procedure, an existing portfolio may be found to be inconsistent with efficiency and an alert produced indicating a need to rebalance to the appropriate target optimal portfolio. Implementation of a rebalancing test is described in detail below. Referring to FIG. 4, statistically equivalent portfolios within the risk/return plane are shown corresponding to three particular risk rankings on the efficient frontier: namely, minimum variance 14, maximum return 16, and a middle return portfolios 18.

In the context of statistical equivalence of portfolios, a "when-to-trade probability" or "rebalance probability" is defined as the confidence level of rejection test for portfolio statistical equivalence. More particularly, with respect to an "optimal resampled efficient portfolio," described in detail below, the "when-to-trade probability" is defined as the percentage of resampled portfolios "closer" (in terms of a norm to be discussed below) to the "optimal resampled efficient portfolio" than the portfolio in question, i.e., the CURRENT portfolio. The norm typically employed is that of the variance of a portfolio with respect to a particular optimal resampled efficient portfolio (commonly referred to as tracking error), however other norms are within the scope of the present invention.

Referring further to FIG. 4, all resampled portfolios within the risk/return plane may be associated, many-to-one, with particular portfolios on MV efficient frontier 10. Various criteria may be applied in associating portfolios with those on the MV efficient frontier, and all such associations are within the scope of the present invention. As one example, each of the K efficient frontier portfolios (i.e., each point on efficient frontier 10) may be identified by its relative return rank. Similarly, the efficient frontier portfolios may be ranked by their variance, the maximum variance corresponding to the maximum return, the rankings by risk or return similarly mapping onto one another uniquely. Thus, for example, the minimum variance portfolio 14 might have the lowest rank relative to the other efficient portfolios of efficiency frontier 10. Similarly, maximum average return portfolio 16 has the highest average return rank in each simulated efficient frontier. Similarly, any other simulated portfolio is rank associated with a particular efficient frontier portfolio. The sparsely clustered portfolios 18 shown in the figure correspond to the 'middle' ranked efficient portfolio. In practice, the shape of the rank-associated regions varies in dependence upon the position of the portfolio on the MV efficient frontier.

It is not necessary, however, that the association with efficient frontier portfolios be by rank, and particular portfolios on the MV efficient frontier may be indexed, and thus index-associated, each with a set of statistically equivalent efficient portfolios lying below the efficient frontier. Indexing, for example, of the set of MV efficient portfolios may be by associating with each MV efficient portfolio a "lambda value," defining the risk/return preference, with respect to which the quantity $\phi = \sigma^2 - \lambda\mu$ is minimized, where $\sigma^2$ is the variance of each portfolio and $\mu$ is the expected return of each portfolio of the set of portfolios located on the mean variance efficient frontier. The parameter $\lambda$ assumes a value between zero and infinity.

Moreover, association of efficient portfolios for deriving an average (in a specified sense), and thus a resampled efficient frontier, are not required to be index-ranked at all, within the scope of the present invention. Indeed, in alternate embodiments of the invention, 'neighboring', or otherwise related, portfolios may be grouped, in order to achieve desired aggregation of portfolio characteristics.

Methods for association for averaging portfolios relative to an index set include equal or weighted averages by significance or other nearness measures where the index set defined for all simulated portfolios in the resampling process. An example of an index set may include the set of simulated portfolios with similar utility values. In a further example, a resampled frontier may represent a best-fit curve through portfolio space of simulated portfolios with weighted averages taken over some specified subset.

Figure 7:
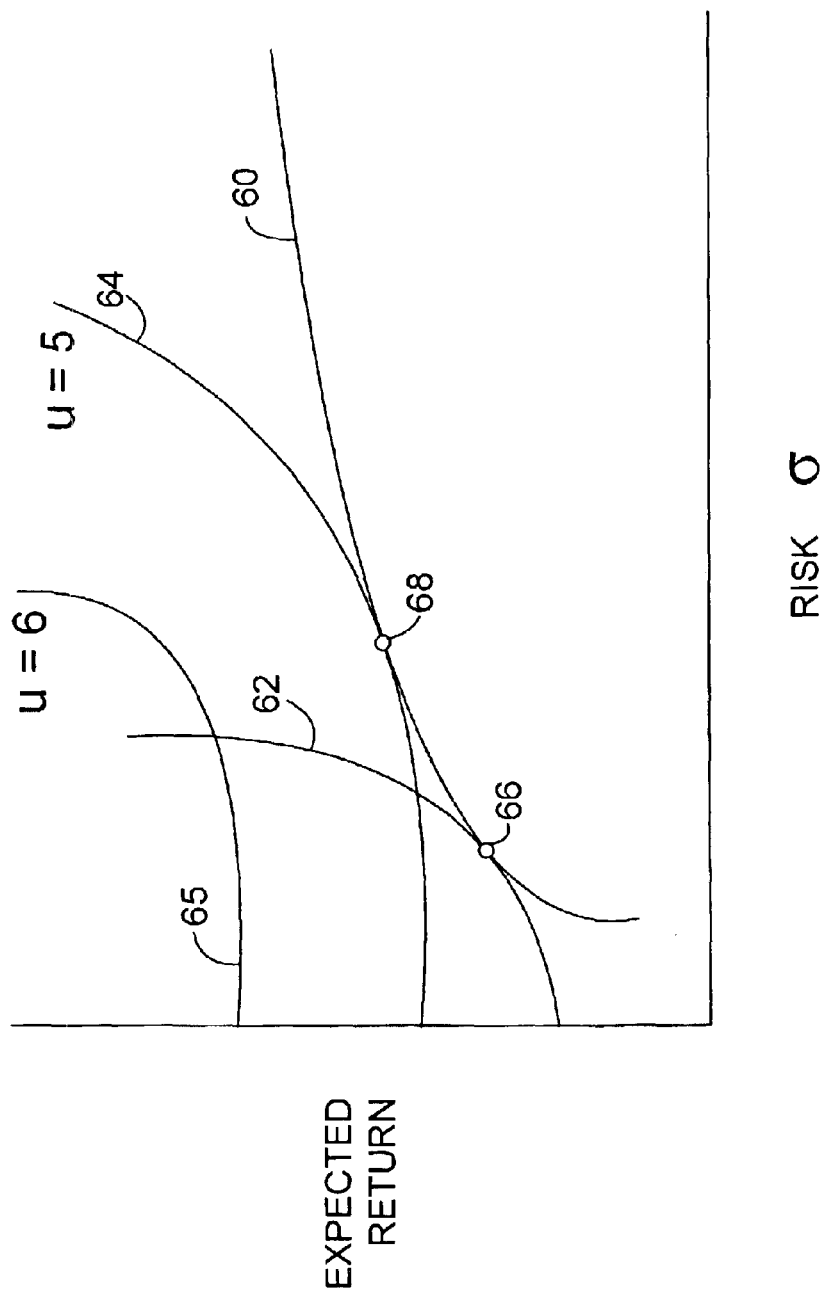
FIG. 7 is a plot showing an identified portfolio on a resampled efficient frontier based on a specified maximum expected utility point.

An alternative means of associating portfolios from distinct ensembles of portfolios, say, for example, as derived from successive resamplings, may be on the basis of maximizing expected utility. Referring to FIG. 7, an efficient frontier 60 is shown in the risk-return plane. Various utility functions 62, 64, and 65 are plotted as may be specified for particular investors. Each plotted utility function curve, say 64 for example, represents a constant utility for the specified investor. Utility function 62, for example, obeys a different functional law from that of utility function 64. Functional forms typically employed may be exponential and/or polynomial functions of risk.

Utility functions 64 and 65 obey an identical functional dependence of return vs. acceptable risk, differing only in the total utility, indicated, by way of example, by the quantity u which assumes the value 5 and 6 for curves 64 and 65 respectively. The point 68 on efficient frontier 60 may be characterized in that it represents a portfolio that maximizes the expected utility with respect to the class of utility functions to which curves 64 and 65 belong. Similarly, point 66 on efficient frontier 60 may be characterized in that it represents a portfolio that maximizes the expected utility with respect to the class of utility functions to which curve 62 belongs. Other points on efficient frontier 60 may be characterized in terms of their 'distance' (as defined by a specified norm) from point 68 of maximum expected utility. Similarly, points on different efficient frontiers may be associated, as described herein in the context of defining a resampled efficient frontier, on the basis of their identity or proximity to portfolios maximizing expected utility with respect to specified utility functions.

Rebalancing of a portfolio is indicated if the current portfolio is statistically distinct from a target optimized portfolio on a resampled efficient frontier identified according to criteria to be discussed below. "Proximity" of one portfolio (whether resampled, indexed or otherwise) to a corresponding portfolio may be defined in terms of a test metric based on a "norm," with the norm having the usual properties of a distance function as known to persons skilled in the mathematical arts. The properties of a norm defined in a vector space are well-known: a norm associates a non-negative value with any vector in the space, preserves scalar multiplication, and obeys the relation $\|x+y\| \leq \|x\|+\|y\|$.

Various norms may be used for defining distance in the risk/return space. The distance criterion for any portfolio P is typically taken to be the relative variance for portfolio P, $$(P-P_0)^{t} * S * (P-P_0)$$

where $P-P_0$ is the difference vector of portfolio weights with respect to $P_0$, the corresponding index-associated portfolio on the resampled efficient frontier, and, S is the input return covariance matrix (with the superscript 't' denoting the transpose of the difference vector). The norm is taken in the space of portfolio vectors (i.e., "portfolio space"). Alternative distance criteria may include additional functions (linear or otherwise) of $P-P_0$.

The CURRENT portfolio is measured for statistical distinction against a set of simulated portfolios, the enhanced discriminatory 'power' of the balancing test reflecting the decreasing likelihood that the desirability of rebalancing a portfolio is 'missed.' I.e., a more powerful rebalancing test is less likely to attribute a CURRENT portfolio to a distribution of like portfolios where it properly does not belong to the population. Alternatively, controlling discriminatory power enhances the likelihood of rebalancing only where appropriate.

Figure 8A:
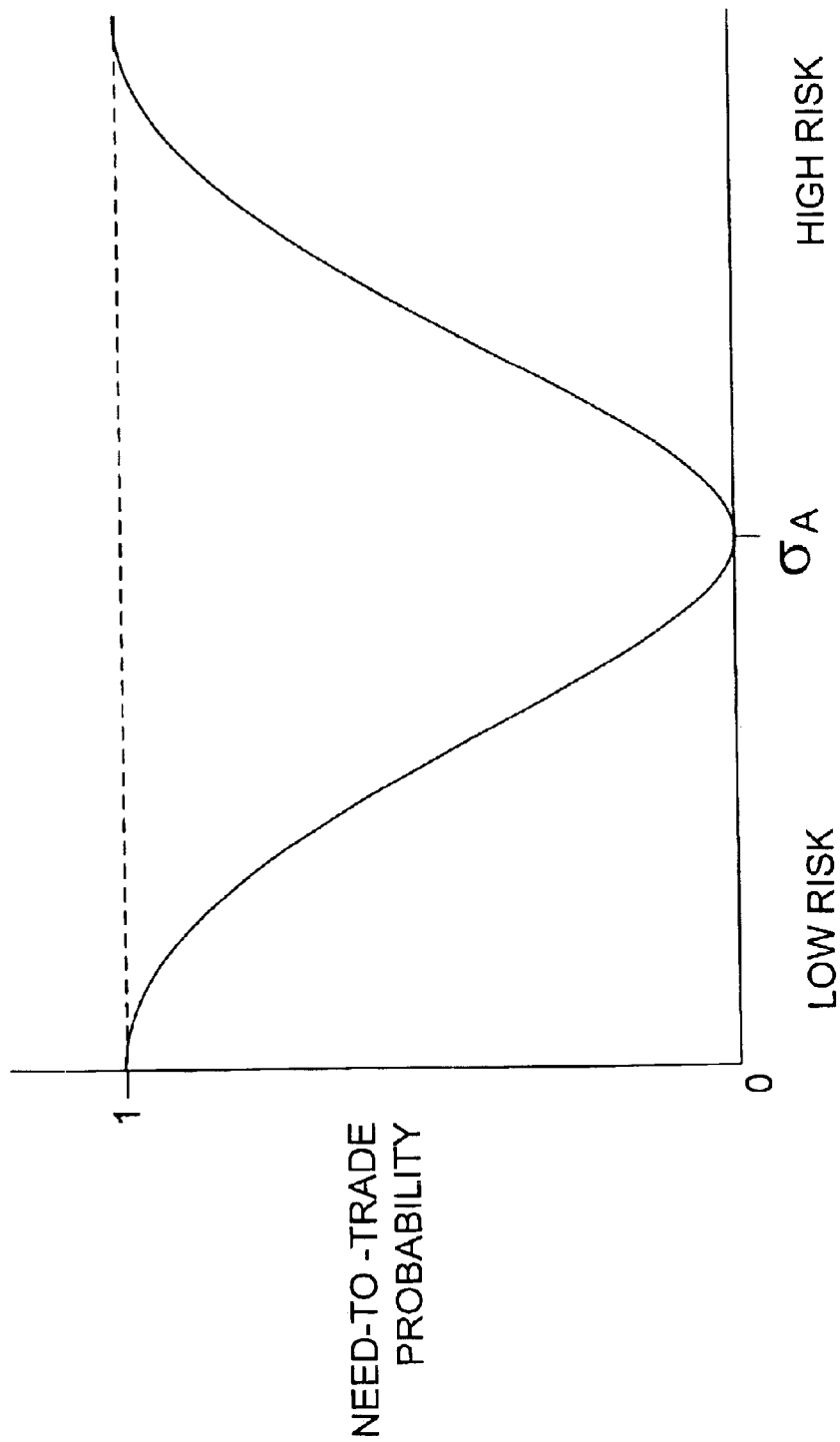
FIG. 8A is a plot showing a typical need-to-trade probability for a specified current portfolio relative to a specified target portfolio as a function of a specified portfolio risk.

Referring to FIG. 8A, an example is shown in which the need-to-trade probability for a given CURRENT portfolio, as determined by a particular rebalancing test, is plotted as a function of portfolio risk. The plot of FIG. 8A thus reflects the enhanced discriminatory power of the specified rebalancing test. The CURRENT portfolio may have an associated residual risk close to a specified value $\sigma_A$, thereby lying sufficiently close to a specified efficient frontier as not to be statistically distinguishable from a target portfolio. The need-to-trade probability may be close to zero over some range, whereas, outside that range, the probability of a given test dictating a need to rebalance rises in case it is desirable to achieve a different level of risk.

The portfolios against which a CURRENT portfolio is tested are typically weighted in performing a statistical rebalancing test. In accordance with embodiments of the present invention, a set of portfolios is retained for performing the statistical test of the CURRENT portfolio with the objective of increasing the discriminatory power of the statistical test. An advantageous benefit that this procedure may provide is that of substantial uniformity of power of the rebalancing test across the entire efficient frontier. This may advantageously be achieved by weighting sample portfolios increasingly with proximity to a target portfolio. Additionally, this procedure may be used advantageously to reduce computational overhead in performing a rebalancing test.

Figure 5:
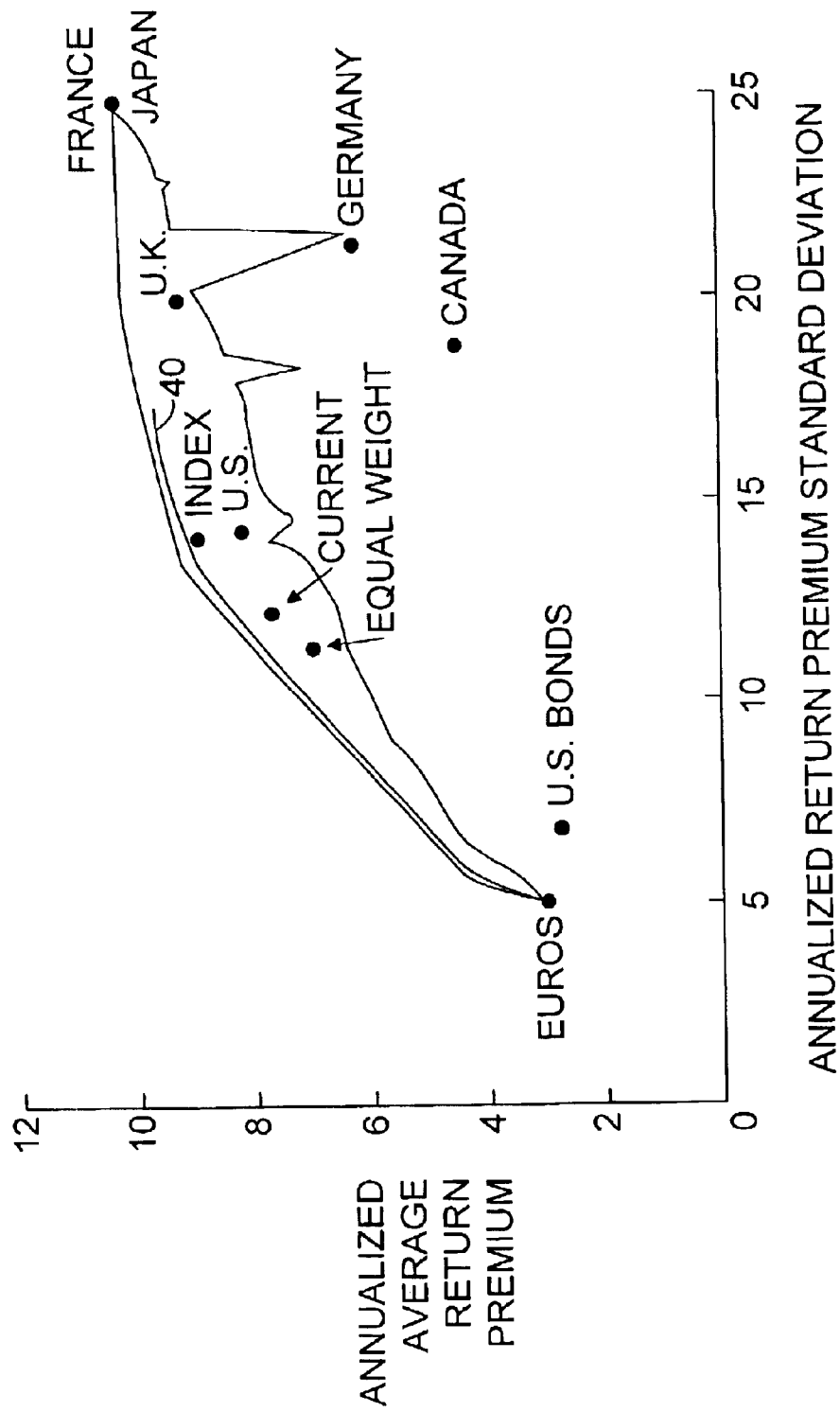
FIG. 5 shows the resampled efficient frontier plotted in the risk/return plane in accordance with a preferred embodiment of the present invention.

Once an ensemble of MV efficient portfolios has been associated, whether by index-set association, proximity to a maximum expected utility point, or other method of aggregation, usual statistical measures of the ensemble may be derived. These measures include, without limitation, the averages, standard errors, and t-statistics of the average of the portfolio weights of the rank-associated simulated efficient portfolios. Referring now to FIG. 5, an average of index-associated MV efficient portfolios may be defined, in accordance with preferred embodiments of the present invention, the average of index-associated MV efficient portfolios being referred to as a "resampled-efficient portfolio." The average may be determined with respect to any of a variety of parameters, and, in accordance with a preferred embodiment, it is with respect to the vector average of the associated portfolios. The vector average of a set of portfolios is defined as the average over the weighted assets of each of the portfolios of the set, taking into account the sign, positive or negative, of the contribution of a particular asset to a particular portfolio. The locus 40 of resampled-efficient portfolios is referred to as the "resampled efficient frontier." The resampled-efficient portfolio and its associated statistics may be applied as a statistical measure for portfolio analysis, as further described herein. Its application, as a choice for portfolio selection, advantageously removes, by definition, the "outlier" portfolios which strongly depend on values of a particular set of inputs and improves out-of-sample performance, on average. Statistical procedures for portfolio analysis and revision, and performance benefits based on these concepts, are further described in detail in the Michaud book.

Forecast Certainty Levels

Figure 6:
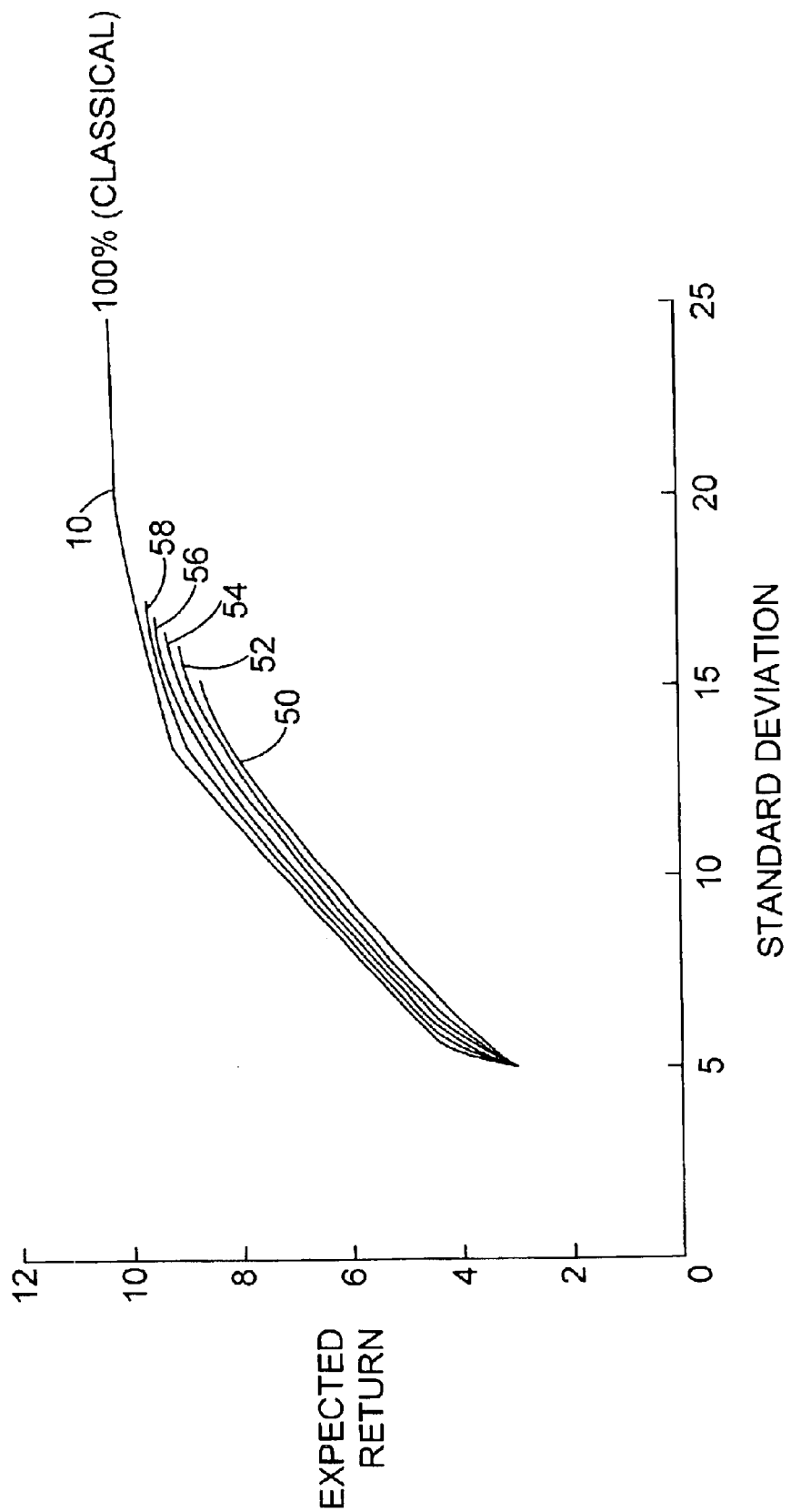
FIG. 6 shows the classical and several resampled efficient frontiers, illustrating various levels of estimation certainty in accordance with embodiments of the present invention.

In particular, the number of resampling simulations that are performed and efficient frontiers that are computed may be specified, prior to obtaining the average, or resampled efficient frontier, as discussed in the foregoing paragraph. Higher numbers of returns drawn from a simulation correspond to higher levels of estimation certainty, as shown in FIG. 6. The uppermost efficient frontier 10 is, as before, the classical efficient frontier, determined on the basis of the original inputs associated with each asset. Resampled efficient frontiers 50, 52, 54, 56 and 58, correspond to increasing numbers of simulations (or numbers of simulations periods per simulation), and thus to increasing levels of estimation certainty.

More particularly, in accordance with embodiments of the present invention, forecast certainty may vary among input data sets, with particular data sets giving rise to greater forecast certainty in predicted performance than other input data sets. Optimization inputs generally reflect a forecast or expected return process assumed to have, on average, a positive correlation with ex post returns. The level of information is typically expressed as the "information correlation" (IC)—e.g., an IC of 0.2 reflects an expected correlation of 0.2 of forecast with ex post returns.

Information correlation refers to the assumed correlation between a forecast and ex post actual return. IC typically varies with firm strategy, industry, sector, etc. and may be stated, generally, to be a proxy for relative forecast certainty associated with a particular data set. More generally, forecast certainty may be associated with the level of information correlation (IC) and also by the standard deviation of the IC distribution.

In addition to varying the number of resampling simulations, it is thus also within the scope of the present invention to vary the number of simulation periods that define the inputs used to define each simulated efficient frontier. One purpose of the resampling procedure is to include an appropriate level of forecast uncertainty into the resampled optimization inputs. To that end, resampled inputs may be designed to reflect a range of forecast certainty levels. The resampling parameter N provides a means of controlling the level of certainty implicit in the forecast process.

In accordance with preferred embodiments of the present invention, an index value, assuming a numerical value between 1 and N, is associated with a forecast certainty attributed by an analyst to a data set. The index value corresponds to the number of resamplings for a particular simulation. Thus, the more resamplings, the higher the forecast certainty, with higher index values corresponding to successive resampled efficient frontiers, 50, 52, 54, 56 and 58, as depicted in FIG. 6.

In a preferred embodiment, ten levels of certainty may be defined, where 1 represents very uncertain and ten represents high but not perfect forecast certainty. In this preferred embodiment, an "average" level of forecast certainty is chosen for a particular application. For example, for equity portfolio optimization, level 4 may be defined as corresponding to a level of certainty consistent with the way many commercial risk models are estimated. In this case level 4 may be defined as drawing five years or sixty months of monthly observations from the monthly distribution. Other certainty levels associated with each level represent a geometric increase (or decrease) in the number of observations drawn from the distribution (e.g. if level 4 corresponds to 60 monthly observations, level 6 may correspond to 90 monthly observations and level 7 to 135 monthly observations).

Refined Discrimination Power of Rebalancing Tests

It is a characteristic of classical efficient frontiers that portfolios at the high-risk extreme tend to be concentrated—specifically, with high weighting of assets bearing high expected returns. On the other hand, portfolios of resampled efficient frontiers at the corresponding high-risk extreme tend to be substantially diversified.

Figure 8B:
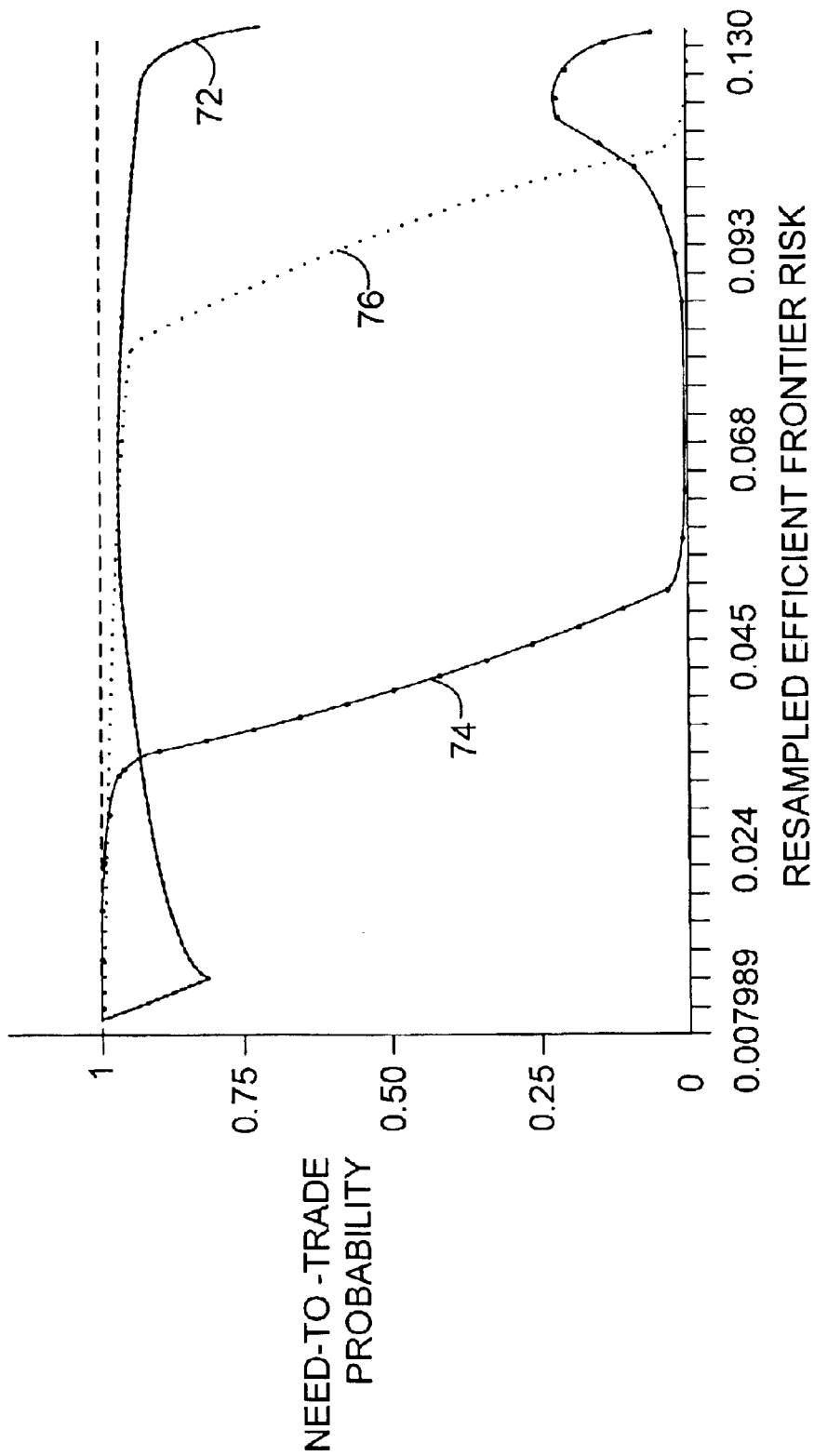
FIG. 8B is a plot showing need-to-trade probabilities for a three specified current portfolios relative to corresponding specified target portfolios as a function of a specified portfolio risk, using classical efficient portfolios.

FIG. 8B shows that this leads to unsatisfactory statistical implications if a target portfolio based on resampled optimizations is compared with portfolios on a classical efficient frontier. In particular, for the case of low-risk portfolios, points plotted along curve 72 show a need-to-trade (i.e., a probability near unity) in almost all instances, where classical efficient portfolios are employed, since optimization will emphasize a particular low-risk target asset. Similarly, for the case of high-risk portfolios, classical efficient portfolios will also indicate a need-to-trade in most cases, as shown along curve 76, in this case because maximum-return assets will be emphasized. A convenient method for calibrating the portfolio rebalancing procedure is to select a set of portfolios that are considered to be statistically equivalent to an optimal portfolio and adjust the free parameters so as to include the set of portfolios in the statistically equivalent region for an appropriate acceptance level. Curve 74 depicts the case of medium-risk portfolios indicating little discriminatory power with respect to high risk efficient portfolios.

Figure 8C:
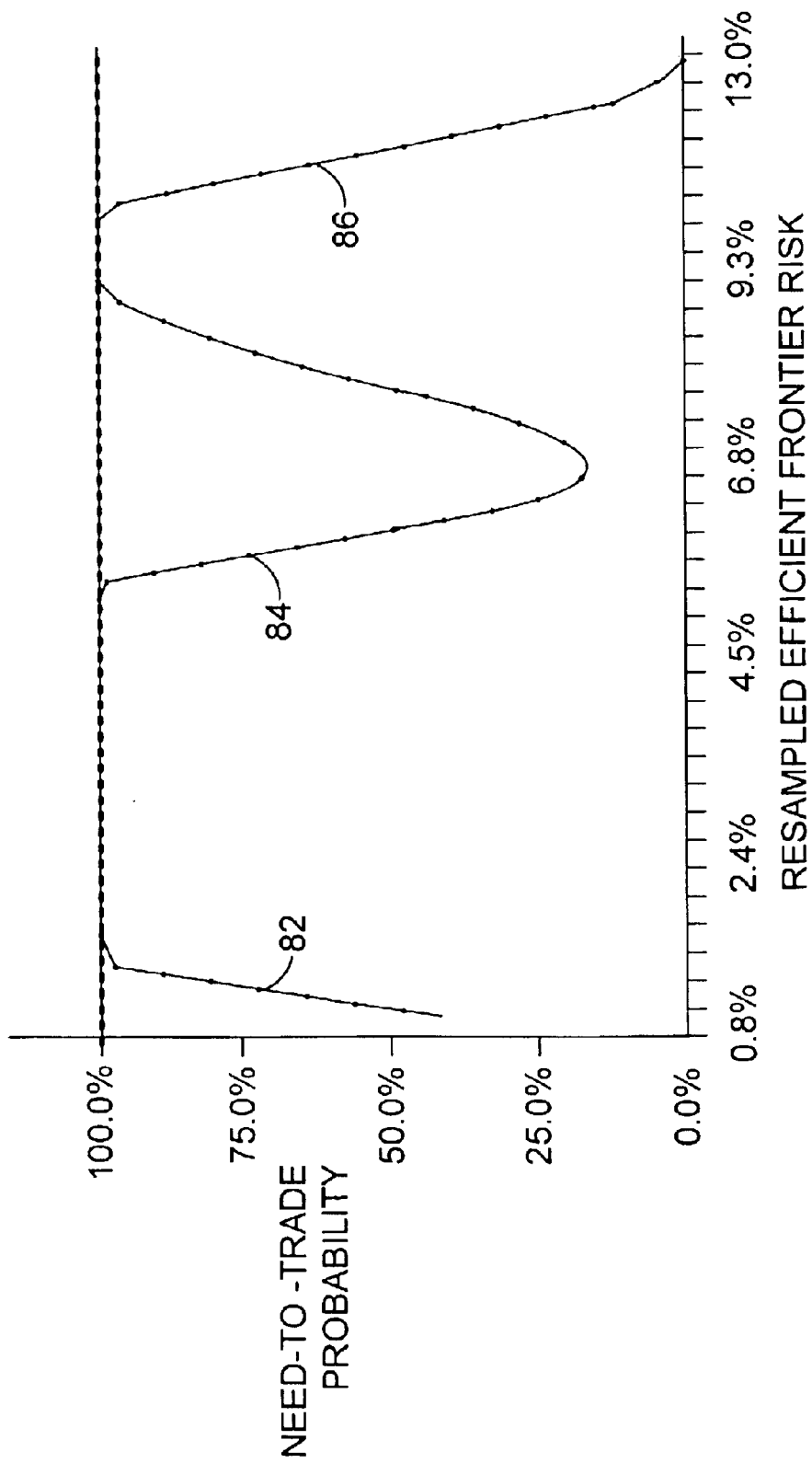
FIG. 8C is a plot showing need-to-trade probabilities for a three specified current portfolios relative to corresponding specified target portfolios as a function of a specified portfolio risk, using resampled efficient portfolios in accordance with embodiments of the present invention.

FIG. 8C shows that need-to-trade probabilities are ameliorated at both the low-risk (curve 82) and high-risk (curve 86) ends, as well as for the case of medium risk (curve 84), where resampled efficient frontiers are used for discrimination of need-to-trade, in accordance with the present invention. In each instance, a region of nearly symmetric 'tolerance' exists where reasonably diversified portfolios are determined to be statistically similar to optimized targets.

Consequently, in accordance with preferred embodiments of the invention, an associated meta-resampled efficient frontier is found, as described above, for each classical efficient frontier corresponding to a simulation of returns. This procedure may advantageously lead to a rebalancing test of greater uniformity, particularly at the high-risk end of the resampled efficient frontier, and thereby advantageously providing for automation of some or all rebalancing decisions if so desired.

Additionally, in certain circumstances, it is desirable to control the power of a rebalancing test across the spectrum of portfolio risk in accordance with particular investment objectives and strategies, objectives, and end-user requirements. One means to that end is ensuring the statistical relevance of the ensemble of statistically weighted portfolios against which a CURRENT portfolio is tested. To that end, two parameters are significant: the percentage of relevant simulations to keep for purposes of statistical comparison with the CURRENT portfolio, and a 'relevance' criterion governing the number of portfolios retained within the ensemble per simulation. The first parameter, generally, has the effect of increasing the power of a rebalancing test as fewer simulations are kept. With respect to the second parameter, increasing the number of portfolios per simulation reduces the power of the test while, at the same time, typically spreading out the power over an increased range of portfolio risk.

Restriction of the percentage of simulations, or of the considered portfolios per simulation, for statistical consideration may be further refined by averaging simulations to yield meta-resampled efficient frontiers, thereby deriving benefits associated with comparing resampled portfolios with resampled, rather than classically optimized, portfolios, as described above.

Estimating Normal Ranges of Portfolio Weights

Defining an investment-relevant normal range of portfolio weights provides useful guidelines for many asset management functions including at-a-glance identification of anomalous portfolio structure and instances in which portfolio rebalancing to optimality may be advisable.

For each asset of a target optimal portfolio, an enhanced estimate of the normal range of asset weights can be calculated. The range incorporates the distribution of the asset weights of the associated meta-resampled or bootstrapped resampled portfolios. In a preferred embodiment, the associated meta-resampled portfolios asset weights for each asset of the target portfolio form a meta-resampled distribution of asset weights. Various descriptive statistical measures can then be applied to provide an estimate of a normal range relative to each asset of the target optimal portfolio. For example, in the table below, the 25th and 75th percentile values of the meta-resampled distribution of asset weights for each asset for ten asset classes for medium and high risk resampled efficient target portfolios based on historical return data are given. Unlike current asset range estimate methods, resampled methods provide investment relevant estimates that vary in statistical characteristics by asset and target portfolio risk.

| Resampled Index-Associated Portfolio Weights Range Estimates | | | | |
|---|---|---|---|---|
| | Medium Risk | | High Risk | |
| | 25th Pctile | 75th Pctile | 25th Pctile | 75th Pctile |
| Money Market | 10% | 22% | 0% | 0% |
| Intermediate Fixed | 12% | 34% | 0% | 1% |
| Long Term Fixed | 3% | 14% | 1% | 12% |
| High Yield Corp | 3% | 19% | 0% | 4% |
| Large Cap Value | 2% | 13% | 1% | 17% |
| Large Cap Growth | 0% | 5% | 1% | 12% |
| Small/Mid Cap Value | 0% | 3% | 0% | 7% |
| Small/Mid Cap Growth | 0% | 4% | 4% | 35% |
| International Stocks | 2% | 14% | 3% | 30% |
| Real Estate | 3% | 15% | 2% | 25% |

In alternative embodiments, the disclosed methods for evaluating an existing or putative portfolio may be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

Once an optimized set of portfolio weights is determined according to a specified risk objective and in accordance with the foregoing teachings, funds are invested in accordance with the portfolio weights that have been determined.

The described embodiments of the invention are intended to be merely exemplary and numerous variations and modifications will be apparent to those skilled in the art. All such variations and modifications are intended to be within the scope of the present invention as defined in the appended claims.

What is claimed is:

1. A computer-implemented method for determining whether to rebalance the distribution of assets in a current portfolio having a plurality of assets, the current portfolio having a total portfolio value, each asset having a value forming a fraction of the total of portfolio value, each asset having a defined expected return and a defined standard deviation of return, each asset having a covariance with respect to each of every other asset of the plurality of assets, the method comprising;

a. computing a set of meta-resampled efficient frontiers based on a resampled efficient frontier;

b. identifying a target portfolio from the resampled efficient frontier based on a specified criterion;

c. defining a statistical metric of the target portfolio based on norm values of a set of associated simulated efficient portfolios with respect to the target portfolio;

d. performing a statistical test, characterized by parameters, of the current portfolio with respect to the target portfolio as to whether the current portfolio is statistically distinct from the target portfolio to a specified confidence level, wherein processes (a) and (d) are digital computer processes; and e. rebalancing the current portfolio considering statistical distinction of the current portfolio from the target portfolio.

2. A method according to claim 1, wherein the step of performing a statistical test includes calibrating the statistical test with respect to the identified target portfolio and executing a rebalancing decision without further user input.

3. A method according to claim 2, wherein calibrating the parameters of the statistical test is based on a specified information set and specified investment objectives.

4. A method according to claim 1, wherein the step of identifying a target portfolio from among the set of resampled efficient portfolios includes identifying the target portfolio on the basis of maximum expected utility of the target portfolio.

5. A method according to claim 1, wherein the step of performing the statistical test of the current portfolio includes weighting each portfolio of the associated simulated portfolios in accordance with a proximity of the portfolio to the current portfolio.

6. A method according to claim 1, further including a step of associating simulated portfolios based on a selection of relevant simulations.

7. A method according to claim 6, wherein the step of performing a statistical test of the current portfolio includes specifying a fraction of portfolios per simulation to be considered in the statistical test.

8. A computer-implemented method for determining whether to rebalance the distribution of assets in a current portfolio having a plurality of assets, the current portfolio having a total portfolio value, each asset having a value forming a fraction of the total of portfolio value, each asset having a defined expected return and a defined standard deviation of return, each asset having a covariance with respect to each of every other asset of the plurality of assets, the method comprising:

a. computing a set of meta-resampled efficient frontiers based on a resampled efficient frontier;

b. identifying a target portfolio from the resampled efficient frontier based on a specified criterion;

c. performing a statistical test, characterized by parameters, of the current portfolio with respect to a weighted subset of portfolios on the set of meta-resampled efficient frontiers as to whether each asset of the current portfolio falls within a range statistically distinct from that of the target portfolio, wherein processes (a) and (c) are digital computer processes; and d. rebalancing the current portfolio in case an asset of the current portfolio is outside a range of statistical congruence with that of the target portfolio.

9. A method according to claim 8, wherein the step of performing a statistical test includes calibrating the statistical test with respect to the identified target portfolio and executing a rebalancing decision without further user input.

10. A method according to claim 9, wherein calibrating the parameters of the statistical test is based on a specified information set and specified investment objectives.

* * * * *

UNITED STATES PATENT AND TRADEMARK OFFICE
CERTIFICATE OF CORRECTION

| | |
|---|---|
| PATENT NO. | : 6,928,418 B2 |
| APPLICATION NO. | : 10/280384 |
| DATED | : August 9, 2005 |
| INVENTOR(S) | : Robert Michaud et al. |

It is certified that error appears in the above-identified patent and that said Letters Patent is hereby corrected as shown below:

Col. 14, lines 57-59
replace "defining a statistical metric of the target portfolio based on norm values of a set of associated simulated efficient portfolios with respect to the target portfolio;"

with --defining a statistical metric of the target portfolio based on norm values of a set of associated simulated efficient portfolios from the meta-resampled efficient frontiers with respect to the target portfolio;--

Signed and Sealed this

Thirty-first Day of March, 2009

JOHN DOLL
*Acting Director of the United States Patent and Trademark Office*